US008010545B2

(12) United States Patent
Stefik et al.

(10) Patent No.: US 8,010,545 B2
(45) Date of Patent: *Aug. 30, 2011

(54) SYSTEM AND METHOD FOR PROVIDING A TOPIC-DIRECTED SEARCH

(75) Inventors: Mark J. Stefik, Portola Valley, CA (US);
Lichan Hong, Mountain View, CA (US);
Stuart K. Card, Los Altos, CA (US);
Peter L. Pirolli, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/354,681

(22) Filed: Jan. 15, 2009

(65) Prior Publication Data

US 2010/0057716 A1    Mar. 4, 2010

Related U.S. Application Data

(60) Provisional application No. 61/092,727, filed on Aug. 28, 2008.

(51) Int. Cl.
*G06F 7/00* (2006.01)
*G06F 17/30* (2006.01)

(52) U.S. Cl. ........................................ 707/758; 707/781

(58) Field of Classification Search .......... 707/999.001–999.01

See application file for complete search history.

(56) References Cited

U.S. PATENT DOCUMENTS

| 5,257,939 A | 11/1993 | Robinson et al. |
| 5,369,763 A | 11/1994 | Biles |
| 5,530,852 A | 6/1996 | Meske et al. |
| 5,671,342 A | 9/1997 | Millier et al. |
| 5,680,511 A | 10/1997 | Baker et al. |
| 5,724,567 A | 3/1998 | Rose et al. |

(Continued)

FOREIGN PATENT DOCUMENTS

EP    1571579    9/2005

(Continued)

OTHER PUBLICATIONS

Rocha L. M., "Adaptive Webs for Heterarchies With Diverse Communities of Users," Workshop From Intelligent Networks to the Global Brain: Evolutionary Technology, pp. 1-35 (Jul. 3, 2001).
Arasu et al., "Searching the Web," ACM, New York, NY, US, pp. 2-43 (Aug. 1, 2001).
C. Holahan, "So Many Ads, So Few Clicks," BusinessWeek, p. 38 (Nov. 12, 2007).
G. Miller, "The Magical Number Seven, Plus or Minus Two: Some Limits on our Capacity for Processing Information," Psychological Review, vol. 63, pp. 81-97 (1956).

(Continued)

*Primary Examiner* — Usmaan Saeed
(74) *Attorney, Agent, or Firm* — Patrick J. S. Inouye

(57) ABSTRACT

A system and method for providing a topic-directed search is provided, which advantageously harnesses user-provided topical indexes and an ability to characterize indexes according to how articles fall under their topical organizations. A corpus of articles and an index that includes topics from the articles is maintained. For each topic, a coarse-grained topic model is built, which includes the characteristic words included in the articles relating to the topic and scores assigned to the characteristic words. A search query is executed against the index. The topics that match the search terms are chosen by their scores. The topics that match the coarse-grained topic models and the articles corresponding to the search query are presented. In contrast to conventional search engines, search results are organized according to topic and search results can be offered across multiple indexes, where part of returned results are selected from most-relevant indexes with their most-relevant topics.

16 Claims, 11 Drawing Sheets

U.S. PATENT DOCUMENTS

| | | | |
|---|---|---|---|
| 5,784,608 | A | 7/1998 | Meske et al. |
| 5,907,677 | A | 5/1999 | Glenn et al. |
| 5,907,836 | A | 5/1999 | Sumita et al. |
| 5,953,732 | A | 9/1999 | Meske et al. |
| 6,021,403 | A | 2/2000 | Horvitz et al. |
| 6,052,657 | A | 4/2000 | Yamron et al. |
| 6,064,952 | A | 5/2000 | Imanaka et al. |
| 6,233,570 | B1 | 5/2001 | Horvitz et al. |
| 6,233,575 | B1 | 5/2001 | Agrawal et al. |
| 6,240,378 | B1 | 5/2001 | Imanaka et al. |
| 6,247,002 | B1 | 6/2001 | Steels |
| 6,269,361 | B1 | 7/2001 | Davis et al. |
| 6,285,987 | B1 | 9/2001 | Roth et al. |
| 6,292,830 | B1 | 9/2001 | Taylor et al. |
| 6,397,211 | B1 | 5/2002 | Cooper |
| 6,598,045 | B2 | 7/2003 | Light et al. |
| 6,772,120 | B1 | 8/2004 | Moreno et al. |
| 6,804,688 | B2 | 10/2004 | Kobayashi et al. |
| 6,981,040 | B1 | 12/2005 | Konig et al. |
| 7,062,485 | B1 * | 6/2006 | Jin et al. .............. 1/1 |
| 7,092,888 | B1 | 8/2006 | McCarthy et al. |
| 7,200,606 | B2 | 4/2007 | Elkan |
| 7,275,061 | B1 * | 9/2007 | Kon et al. .............. 1/1 |
| 7,281,022 | B2 | 10/2007 | Gruhl et al. |
| 7,320,000 | B2 | 1/2008 | Chitrapura et al. |
| 7,426,557 | B2 | 9/2008 | Gruhl et al. |
| 7,467,202 | B2 | 12/2008 | Savchuk |
| 7,496,567 | B1 | 2/2009 | Steichen |
| 7,548,917 | B2 | 6/2009 | Nelson |
| 7,567,959 | B2 | 7/2009 | Patterson |
| 7,600,017 | B2 | 10/2009 | Holtzman et al. |
| 7,685,224 | B2 | 3/2010 | Nye |
| 7,809,723 | B2 | 10/2010 | Liu et al. |
| 7,890,485 | B2 | 2/2011 | Malandain et al. |
| 7,921,092 | B2 * | 4/2011 | Anick et al. .............. 707/705 |
| 2002/0161838 | A1 | 10/2002 | Pickover et al. |
| 2004/0059708 | A1 | 3/2004 | Dean et al. |
| 2005/0097436 | A1 | 5/2005 | Kawatani |
| 2005/0226511 | A1 | 10/2005 | Short |
| 2005/0278293 | A1 * | 12/2005 | Imaichi et al. .............. 707/1 |
| 2006/0167930 | A1 * | 7/2006 | Witwer et al. .............. 707/102 |
| 2007/0050356 | A1 | 3/2007 | Amadio |
| 2007/0156622 | A1 | 7/2007 | Akkiraju et al. |
| 2007/0174267 | A1 * | 7/2007 | Patterson et al. .............. 707/5 |
| 2007/0214097 | A1 | 9/2007 | Parsons et al. |
| 2007/0244690 | A1 | 10/2007 | Peters |
| 2007/0260508 | A1 | 11/2007 | Barry et al. |
| 2007/0260564 | A1 | 11/2007 | Peters et al. |
| 2007/0271086 | A1 | 11/2007 | Peters et al. |
| 2008/0065600 | A1 | 3/2008 | Batteram et al. |
| 2008/0126319 | A1 * | 5/2008 | Bukai et al. .............. 707/3 |
| 2008/0133482 | A1 * | 6/2008 | Anick et al. .............. 707/3 |
| 2008/0140616 | A1 * | 6/2008 | Encina et al. .............. 707/3 |
| 2008/0201130 | A1 | 8/2008 | Peters et al. |
| 2008/0307326 | A1 | 12/2008 | Gruhl et al. |
| 2010/0042589 | A1 | 2/2010 | Smyros et al. |
| 2010/0057577 | A1 * | 3/2010 | Stefik et al. .............. 705/14.73 |
| 2010/0070485 | A1 | 3/2010 | Parsons et al. |
| 2010/0114561 | A1 | 5/2010 | Yasin |
| 2010/0125540 | A1 * | 5/2010 | Stefik et al. .............. 706/12 |
| 2010/0191741 | A1 * | 7/2010 | Stefik et al. .............. 707/748 |
| 2010/0278428 | A1 | 11/2010 | Terao et al. |

FOREIGN PATENT DOCUMENTS

| | | |
|---|---|---|
| WO | 2005073881 | 8/2005 |
| WO | 2007047903 | 4/2007 |

OTHER PUBLICATIONS

C. Anderson, "The Long Tail: Why the Future of Business is Selling Less of More," 2006, Chapter 1, pp. 1-26, Hyperion Press, New York.

Schutze H., "The Hypertext Concordance: A Better Back-of-the-Book Index," 1998, Proceedings of Workshop on Computational Technology, pp. 101-104, Montreal, Canada.

Arampatzis et al., "An Evaluation of Linguistically-Motivated Indexing Schemes," 2000, Proceedings of the BCSIRSG.

Biebricher et al., "The Automatic Indexing System AIR/PHYS—1997, From Research to Application," In Readings in Information Retrieval, Morgan Kaufmann Publishers, San Francisco.

G. Sacco, "Dynamic Taxonomies and Guided Searches," Journal of the American Society for Information Science and Technology, vol. 57, Issue 6, Apr. 2006.

Brin et al., "The Anatomy of a Large-Scale Hypertextual Web Search Engine," Paper presented at the Seventh International Conference on World Wide Web. Apr. 14-18, 1998, Brisbane, Australia.

Card et al., "Readings in Information Visualization: Using Vision to Think," 1999, Section 3 Interaction, pp. 231-259, 295-306, Morgan Kaufmann Publishers, San Francisco.

Chi et al., "EBooks With Indexes that Reorganize Conceptually," Paper presented at Human Factors in Computing Systems Conference Apr. 24-29, 2004, Vienna, Austria.

G. W. Furnas, "Generalized Fisheye Views," Paper presented at the Conference on Human Factors in Computing Systems, 1986, Boston, Massachusetts.

Kusek et al., "The Future of Music: Manifesto for the Digital Music Revolution," Boston: Berklee Press, 2005.

P. Pirolli, "Information Foraging Theory: Adaptive Interaction with Information," Oxford: Oxford University Press, 2007.

H. Simon, "Designing Organizations for an Information-Rich World." In Communications and the Public Interest, ed. Martin Greenberger. 37-72. The Johns Hopkins Press, 1971.

R. D. Burt, "Structural Holes and Good Ideas," American Journal of Sociology, vol. 110, No. 2, pp. 349-399, 2003.

C. Mezei, "The Digg Algorithm-Unofficial FAQ," SeoPedia, www.secopedia.org/tips-tricks/social-media/the-digg-algorithm-unofficial-faq, Nov. 2, 2006.

N. Patel, "There's More to Digg Than Meets the Eye," Pronet Advertising, www.pronetadvertising.com/articles/theres-more-to-digg-than-meets-the-eye.html, Jan. 15, 2007.

J. Dowdell et al., "Digg's Kevin Rose on Recent Indiggnation: Fact vs. Fiction," Marketing Shift, www.marketingshift.com/2006/9/diggs-kevin-rose-recent-indiggnation.cfm, Sep. 7, 2006.

J. Dowdell, "Digg Algorithm for Scoring Stories," Marketing Shift, www.marketingshift.com/2006/9/diggs-algorithm-elements-confirmed.cfm, Sep. 8, 2006.

P. Lenssen, "How Google News Indexes". See http://blogoscoped.com/archive/2006-07-28-n49.html.

A. Agarval, "How Google News works". http://labnol.blogspot.com/2005/05/how-google-news-works.html.

M. Helft, "How a Series of Mistakes Hurt Shares of United". New York Times. http://www.nytimes.com/2008/09/15/technology/15google.html?_r=1.

Imai et al., "Improved Topic Discrimination of Broadcast News Using a Model of Multiple Simultaneous Topics," 1997 IEEE International Conference on Acoustics, Speech, and Signal Processing (ICASSP'97), Apr. 1997, pp. 727-730, vol. 2.

Anonymous "TF-IDF," Wikipedia, the free encyclopedia (Jul. 23, 2007).

Akiko Aizawa, "An Information-Theoretic Perspective of TF-IDF Measures," Information Processing and Management, Elsevier Science Ltd. , vol. 39, No. 1, pp. 45-65 (Jan. 1, 2003).

Nakashima et al., "Information Filtering for the Newspaper," 1997 IEEE Pacific RIM Conference NCE on Victoria, BC, Canada (Aug. 20-22, 1997), vol. 1, pp. 142-145 (Aug. 1997).

G. Linden, "People Who Read This Article Also Read . . . " IEEE Spectrum, vol. 45, No. 3, pp. 46-60 (Mar. 1, 2008).

Bracewell et al., "Reading: A Self Sufficient Internet News System with Applications in Information and Knowledge Mining," Natural Language Processing and Knowledge Engineering, International Conference, IEEE, PI, pp. 190-96 (Aug. 1, 2007).

K. Lerman, "Social Information Processing in News Aggregation," IEEE Computer Society, vol. 11, No. 6, pp. 16-28 (Nov. 1, 2007).

* cited by examiner

FIG. 3

Wadayano — 40

File  Go  View  Help

| Back | -1 | +1 | New Guide | Reader | Pro Editor | Guide for Page ix |

BIOHAZARD  Page ix  (Phys 9) — 43

On a bleak island in the Aral Sea, one hundred monkeys are tethered to posts set in parallel rows stretching toward the horizon. A muffled thud breaks the stillness. Far in the distance, a small metal sphere lifts into the sky then hurtles downward, rotating, until in shatters in a second explosion.

Some seventy-five feet above the ground, a cloud TEST Central Intelligence Agency END TEST the color of dark mustard begins to unfurl, gently dissolving as it glides down toward the monkeys. They pull at their chains and begin to cry. Some bury their heads between their legs. A few cover their mouths or noses, but it is too late: they have already begun to die.

At the other end of the island, a handful of men in biological protective suits observe the scene through binoculars, taking notes. In a few hours, they will retrieve the still-breathing monkeys and return them cages where the animals will be under continuous examination for the next several days until, one by one, they die of anthrax or tularemia, Q fever, brucellosis, glanders, or plague.

— 42

— 44 anthrax (30) ix, 51, P5, 116, 153, 198, 230, 282, 288
biological weapons: (37)
☐ animal testing of ix-x, 17, 21, 27-8, 54, 72-3, 97, 126, 128, 163-4
☐ history of Soviet development of ix-xi, 18-20, 32-44
☐ Biopreparat: (34)
☐ facilities and installations of ix-x, 42-3, 81-2, 195-6
brucellosis (Malta fever) (3) ix, 232, 281, 286
glanders (3) ix, 32, 35, 42, 89, 153, 167, 232, 268-9, 286
plague (17) ix, 115, 164-6, 279, 288
Q fever ix, 35-6, 111, 162, 234, 281, 286
Rebirth Island ix-x, 15-8, 26-8, 31-2, 36, 105
Soviet Union: (12)
☐ history of biological weapons development in ix-xi, 18-20, 32-44

— 41

SYSTEM AND METHOD FOR PROVIDING A TOPIC-DIRECTED SEARCH

CROSS-REFERENCE TO RELATED APPLICATION

This non-provisional patent application claims priority under 35 U.S.C. §119(e) to U.S. Provisional Patent Application, Ser. No. 61/092,727, filed Aug. 28, 2008, the disclosure of which is incorporated by reference.

FIELD

This application relates in general to digital information search and, in particular, to a system and method for providing a topic-directed search.

BACKGROUND

The Worldwide Web ("Web") is an open-ended digital information repository into which new information is continually posted. The information on the Web can, and often does, originate from diverse sources, including authors, editors, collaborators, and outside contributors commenting, for instance, through a Web log, or "Blog." Such diversity suggests a potentially expansive topical index, which, like the underlying information, continuously grows and changes.

Topically organizing an open-ended information source, like the Web, can facilitate information discovery and retrieval, such as described in commonly-assigned U.S. Patent Application, entitled "System and Method for Performing Discovery of Digital Information in a Subject Area," Ser. No. 12/190,552, filed Aug. 12, 2008, pending, the disclosure of which is incorporated, by reference. Books have long been organized with topical indexes. However, constraints on codex form limit the size and page counts of books, and hence index sizes. In contrast, Web materials lack physical bounds and can require more extensive topical organization to accommodate the full breadth of subject matter covered.

The lack of topical organization makes effective searching of open-ended information repositories, like the Web, difficult. A user may not know the subject matter being searched, or could be unaware of the information available. Even if knowledgeable, the user may be unable to specify the exact information desired, or might stumble over problematic variations in vocabulary. Search results alone often lack needed topical signposts, yet even when topically organized, only a subpart of a full index of all Web topics may be germane to a given subject.

Conventional Web search engines retrieve information, such as articles, in response to a search query that is typically composed of only a few search terms. When a corpus is extensive, such as when articles gathered from the Web span wide-ranging topics, users may encounter ambiguity in identifying the precise information needed. Furthermore, Web search engines often return information in a disorganized jumble that intermixes the information over disparate topics, thereby making assimilation of the results and new query formulation hard.

Conventional Web search engines also operate without an index or knowledge of the topical organization of an underlying subject area. Keywords in context ("KWIC") are sometimes available to emphasize search results that match query terms, but a sense of topicality is still lacking. Moreover, even when a form of categorizing is applied, Web search engines generally either rely on separating search results by source, collecting common queries as search representative, or applying clustering techniques to channel search results along popular themes. As a result, search results are often jumbled and topically intermixed sets of articles.

Thus, several interacting challenges for topic search exist. One challenge is that the input to search is minimal. When searching, users want to enter as little as possible in their information requests. Empirically, most user queries contain only one or two words. A second challenge is that the response to an information request be short, and yet provide a guide to the information desired. Providing too much information can be a distraction to the user. A focused index can address this challenge by giving an estimate of the most relevant topics, together with selected related topics, in case the user's information need is misidentified. The dual challenges of providing a high-precision response given a low-precision request is at the heart of a topic search.

One approach to providing focused topical sub-indexes uses finite state patterns, as used in search engine query languages. A finite state pattern can be used to determine which topics within a topical index correspond to a given query. However, most queries are simply too short to provide enough "content signal" to match against those finite state patterns that are suitable for identifying the topics.

Another approach to creating focused topical sub-indexes uses term similarity assessment. Techniques, such as generalized latent semantic analysis and spreading activation, are combined to compute a "term relatedness" score, which measures similarity in the use of terms. Word pair co-occurrence is used as a proxy for term similarity. As a pre-computation, word-pair occurrences are counted within a sliding window over the corpus. The counts for word pairs that co-occur are kept in a large sparse matrix. The matrix can then be used to find words related to search terms. The query terms are matched against the matrix to find other words that co-occur with them. The matching creates a list of related terms. The process is repeated for each of the words added, which can trigger further words to be added to the list. The influences of word-pair occurrences are combined when more than one path leads to an added word. At the same time, index labels can also be used as seeds for another spreading activation process. The process continues where the wave of words related to the query terms intersects the wave of words related to the index terms. After several iterations, the index entries whose label words have been identified as related to the query terms are gathered. Variations on this process can pre-compute the words related to label words. When the related index entries are identified, a sub-index is created containing the index entries having scores sufficiently high to relate their labels to the query terms. A difficulty with these techniques is that they require large co-occurrence matrices at search time, which is generally not practicable in light of the wide range of query terms possible.

Therefore, a need remains for providing a dynamically focused and topically-related sub-index in conceit with a digital information, corpus search.

SUMMARY

When applied across all indexes, the top indexes and their top topics are provided through a topic search that organizes results from search queries by topic. When applied within an index, the top topics in that index are provided through the topic search. The topic search returns not only information, but also either the top indexes or just a focused sub-index that ties die information found with the topics that are most closely connected, with the information. The top indexes or the focused sub-index index enables users to self-orient themselves to the search results. For instance, when the information desired falls under a nearby topic, the user can select that topic from the focused sub-index and begin browsing the information. However, where the terms of the original search query are topically ambiguous, the user can instead select a different subject area with the most relevant topics in the focused sub-index without needing to formulate a new search query.

One embodiment provides a computer-implemented system and method for providing a topic-directed search. A corpus is maintained, which includes articles of digital information, and an index that includes topics that each relate to one or more of the articles. For each topic, a coarse-grained topic model is built, which includes the characteristic words included in the articles relating to the topic and scores assigned to the characteristic words. A search query that includes search terms is executed against the index. The topics that match the search terms are chosen by their scores. The topics that match the chosen coarse-grained topic models and the articles corresponding to the search query are presented through a user interface.

Conventional methods for topic search are inadequate for deployment on dynamic data on a Web scale. These methods lack the advantages provided by pre-computed fine-grained topic models based, on articles in a corpus classified by topic. These methods have recurring requirements for large memory and computation time. In contrast, topic search exploits the pre-computed topical organization of articles that is available from a social indexing system to provide fast and practical topical search.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all with out departing from the spirit and the scope of the present invention. Accordingly, the drawings and detailed description are to be regarded as illustrative in nature and not as restrictive.

BRIEF DESCRIPTION OF THE DRAWINGS

FIG. 3 is a screen shot diagram showing, by way of example, a user interlace providing select digital information and a topically-related sub-index.

DETAILED DESCRIPTION

Glossary

Figure 1:
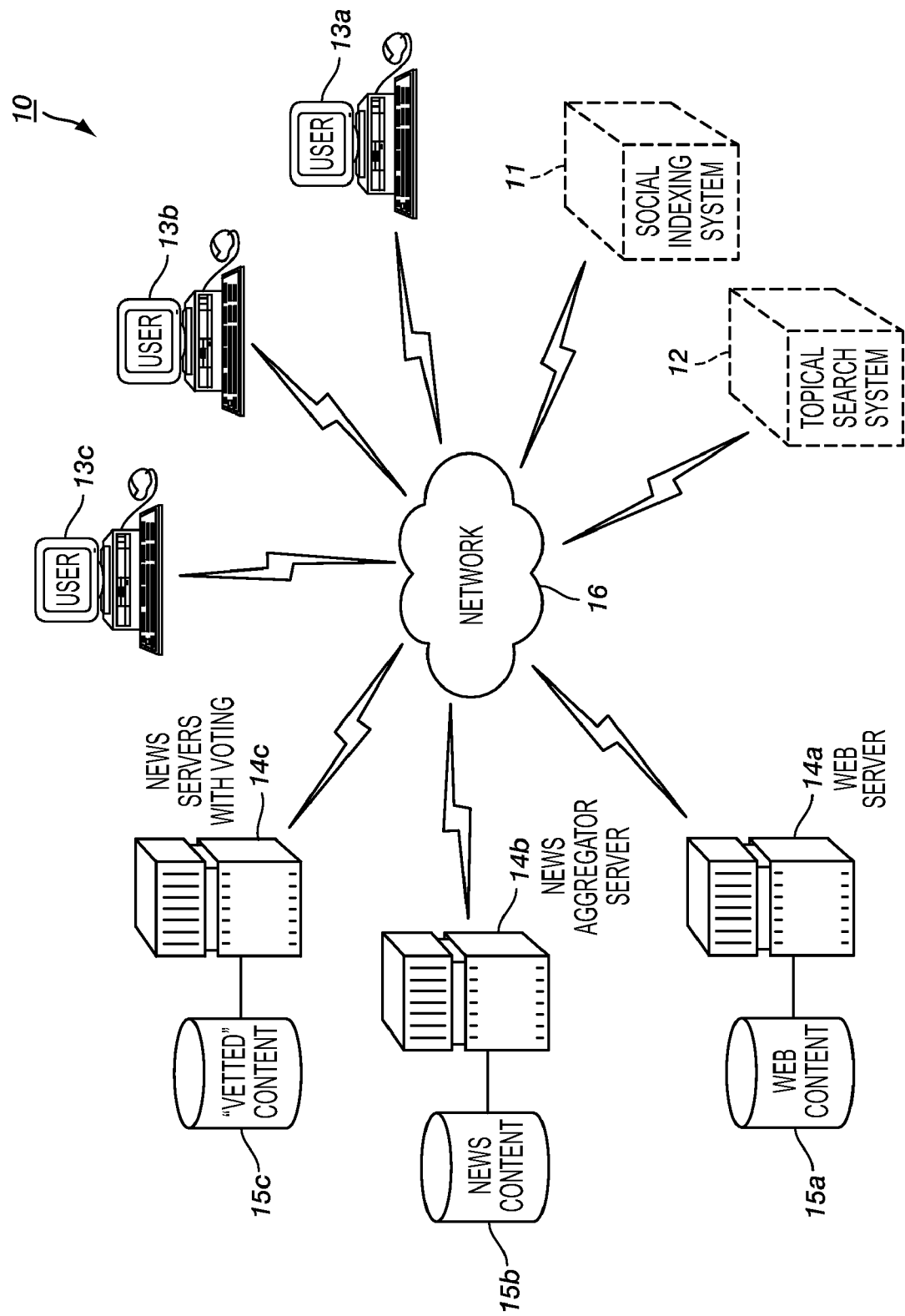
FIG. 1 is a block diagram showing an exemplary environment for digital information sensemaking and information retrieval.

The following terms are used throughout and, unless indicated otherwise, have the following meanings:

Corpus: A collection or set of articles, documents, Web pages, electronic books, or other digital information available as printed material.

Document; An individual article within a corpus. A document can also include a chapter or section of a book, or other subdivision of a larger work. A document may contain several cited pages on different topics.

Cited Page: A location within a document to which a citation in an index, such as a page number, refers. A cited page can be a single page or a set of pages, for instance, where a subtopic is extended by virtue of a fine-grained topic model for indexing and the set of pages contains all of the pages that match the fine-grained topic model. A cited page can also be smaller than an entire page, such as a paragraph, which can be matched by a fine-grained topic model.

Subject Area: The set of topics and subtopics in a social index, including an evergreen index or its equivalent.

Topic: A single entry within a social index. In an evergreen index, a topic is accompanied by a fine-grained topic model, such as a pattern, that is used to match documents within a corpus.

Subtopic: A single entry hierarchically listed under a topic within a social index. In an evergreen index, a subtopic is also accompanied by a fine-grained topic model.

Fine-grained topic model: This topic model is based on finite state computing and is used to determine whether an article falls under a particular topic. Each saved fine-grained topic model is a finite-state pattern, similar to a query. This topic model is created by training a finite state machine against positive and negative training examples.

Coarse-grained topic model; This topic model is based on characteristic words and is used in deciding which topics correspond to a query. Each saved coarse-grained topic model is a set of characteristic words, which are important to a topic, and a score indicating the importance of each characteristic word. This topic model is also created from positive training examples, plus a baseline sample of articles on all topics in an index. The baseline sample establishes baseline frequencies for each of the topics and the frequencies of words in the positive training examples are compared with the frequencies in the baseline samples. In addition to use in generating topical sub-indexes, coarse-grained models can be used for advertisement targeting, noisy article detection, near-miss detection, and other purposes.

Community: A group of people sharing main topics of interest in a particular subject area online and whose interactions are intermediated, at least in part, by a computer network. A subject area is broadly defined, such as a hobby, like sailboat racing or organic gardening; a professional interest, like dentistry or internal medicine; or a medical interest, like management of late-onset diabetes.

Augmented Community: A community that has a social index on a subject area. The augmented community participates in reading and voting on documents within the subject area that have been cited by the social index.

Evergreen Index: An evergreen index is a social index that continually remains current with the corpus.

Social Indexing System: An online information exchange infrastructure that facilitates information exchange among augmented communities, provides status indicators, and enables the passing of documents of interest from one augmented community to another. An interconnected set of augmented communities form a social network of communities.

Information Diet: An information diet characterizes the information that a user "consumes," that is, reads across subjects of interest. For example, in his information consuming activities, a user may spend 25% of his time on election news, 15% on local community news, 10% on entertainment topics, 10% on new information on a health topic related to a relative, 20% on new developments in their specific professional interests, 10% on economic developments, and 10% on developments in ecology and new energy sources. Given a system for social indexing, the user may join or monitor a separate augmented community for each of his major interests in his information diet.

Digital Information Sensemaking and Retrieval Environment

Digital information sensemaking and digital information retrieval are related, but separate activities. The former relates to sensemaking mediated by a digital information infrastructure, which includes public data networks, such as the Internet, standalone computer systems, and various open-ended repositories of digital information. The latter relates to the searching and mining of information from a digital information infrastructure, which may be topically organized through social indexing, or by other source of indexing. FIG. 1 is a block diagram showing an exemplary environment 10 for digital information sensemaking and information retrieval. A social indexing system 11 and a topical search system 12 work in tandem to support, both social indexing and topical search activities.

Digital information is a corpus of information available in digital form, whether an article, Web page, or other item of information. The extent of the information is open-ended, which implies that the corpus and its topical scope grow continually and without fixed bounds on either size or subject matter. A digital data communications network 16, such as the Internet, provides an infrastructure for exchange of the digital information between sources and consumers. Other digital information exchange infrastructures are also possible, for instance, a non-public corporate enterprise network.

The network 16 provides interconnectivity to diverse and distributed information sources and consumers that respectively provide and access the digital information. Authors, editors, collaborators, and outside contributors continually post articles, Web pages, and the like to the network 16, which are maintained as a distributed data corpus though Web servers 14a, news aggregator servers 14b, news servers with voting 14c, and other data repositories that serve as information sources. These sources respectively serve Web content 15a, news content 15b, community-voted or "vetted" content 15c, and other information to users that access the network 16 through user devices 13a-c, such as personal computers, as well as other servers that all function as information consumers. For simplicity, only user devices will be discussed, although servers and other non-user device information consumers may similarly search, retrieve, and use information in the corpus.

In general, each user device 13a-c is a Web-enabled device that executes a Web browser or similar application, which supports interlacing to and information exchange and retrieval with the servers 14a-c. Both the user devices 13a-c and servers 14a-c include components conventionally found in general purpose programmable computing devices, such as a central processing unit, memory, input/output ports, network interfaces, and non-volatile storage, although other components are possible. Moreover, other information sources in lieu of or in addition to the servers 14a-c, and other information consumers, in lieu of or in addition to user devices 13a-c, are possible.

Digital information retrieval is an important part of digital sensemaking. In one embodiment, a topical search system 12 is integrated into a social indexing system 11. The social indexing system 11 provides the topic-classified articles that are the basis for coarse-grained topic models. When a user performs a topic-search based on the indexes in the social indexing system 11, the search results amount to providing either the top indexes and their top topics or just the top topics within a single focused sub-index.

The topical organization provided by the social indexing system 11 can be used advantageously by the topical search system 12, although other sources of indexing could also be used. Search queries from user devices 13a-c are executed against either all of the indexes or a single focused index and a dynamically focused and topically-related set of indexes and their top topics or the top topics within the single focused index are respectively generated by the topical search system 12 for presentation with search results.

Figure 2:
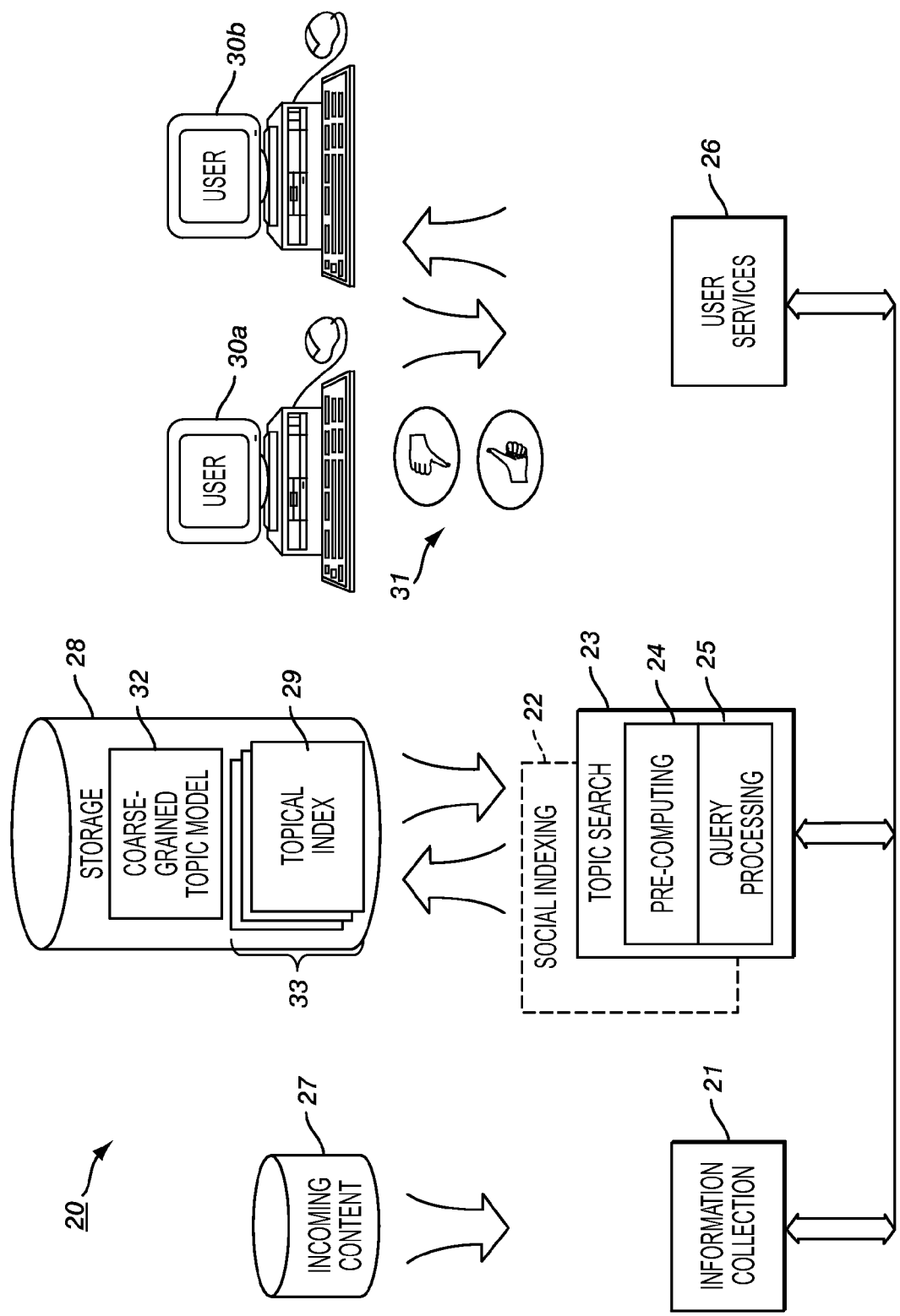
FIG. 2 is a functional block; diagram showing principal components used in the environment of FIG. 1.

From a user's point of view, the environment 10 for digital information retrieval appears as a single information portal, but is actually a set of separate but integrated services. FIG. 2 is a functional block diagram showing principal components 20 used in the environment 10 of FIG. 1. The components are focused on digital information retrieval. Additional components may be required to provide other related digital information activities, such as discovery, prospecting, and orienting.

The components 20 can be loosely grouped into three primary functional modules, information collection 21, topic search 23, and user services 26, plus one optional functional module, social indexing 22. Other functional modules are possible. Additionally, the functional modules can be implemented on the same or separate computational platform. Information collection 21 obtains incoming content 27, such as Web content 15a, news content 15b, and "vetted" content 15c, from the open-ended information sources, including Web servers 14a, news aggregator servers 14b, and news servers with voting 14, which collectively form a distributed corpus of electronically-stored information. The incoming content 27 is collected by a media collector to harvest new digital information from the corpus. The incoming content 27 can typically be stored in a structured repository, or indirectly stored by saving hyperlinks or citations to the incoming content in lieu of maintaining actual copies.

The incoming content 27 may be stored in multiple representations, which differ from the representations in which the information was originally stored. Different representations could be used to facilitate displaying titles, presenting article summaries, keeping track of topical classifications, and deriving and using fine-grained topic models. Words in the articles could also be stemmed and saved in tokenized form, minus punctuation, capitalization, and so forth. Moreover, fine-grained topic models created by the social indexing system 11 represent fairly abstract versions of the incoming content 27 where many of the words are discarded and mainly word frequencies are kept.

The incoming content 27 is preferably organized under at least one topical index 29, which may be part of a larger set of topical indexes 33 that covers all of the information. In a further embodiment, the topical index 29 could be a form of evergreen index built through social indexing 22, such as described in commonly-assigned U.S. patent application "System and Method for Performing Discovery of Digital Information in a Subject Area," Ser. No. 12/190,552, filed Aug. 12, 2008, pending, the disclosure of which is incorporated by reference. The evergreen index contains fine-grained topic models, such as finite state patterns, that can be used to test whether new information falls under one or more of the topics in the index. Social indexing 22 applies supervised machine learning to bootstrap training material into the fine-grained topic models for each topic and subtopic in the topical index 29. Once trained, the evergreen index can be used for index extrapolation to automatically categorize new incoming content 27 into topics for pre-selected subject areas.

Figure 4:
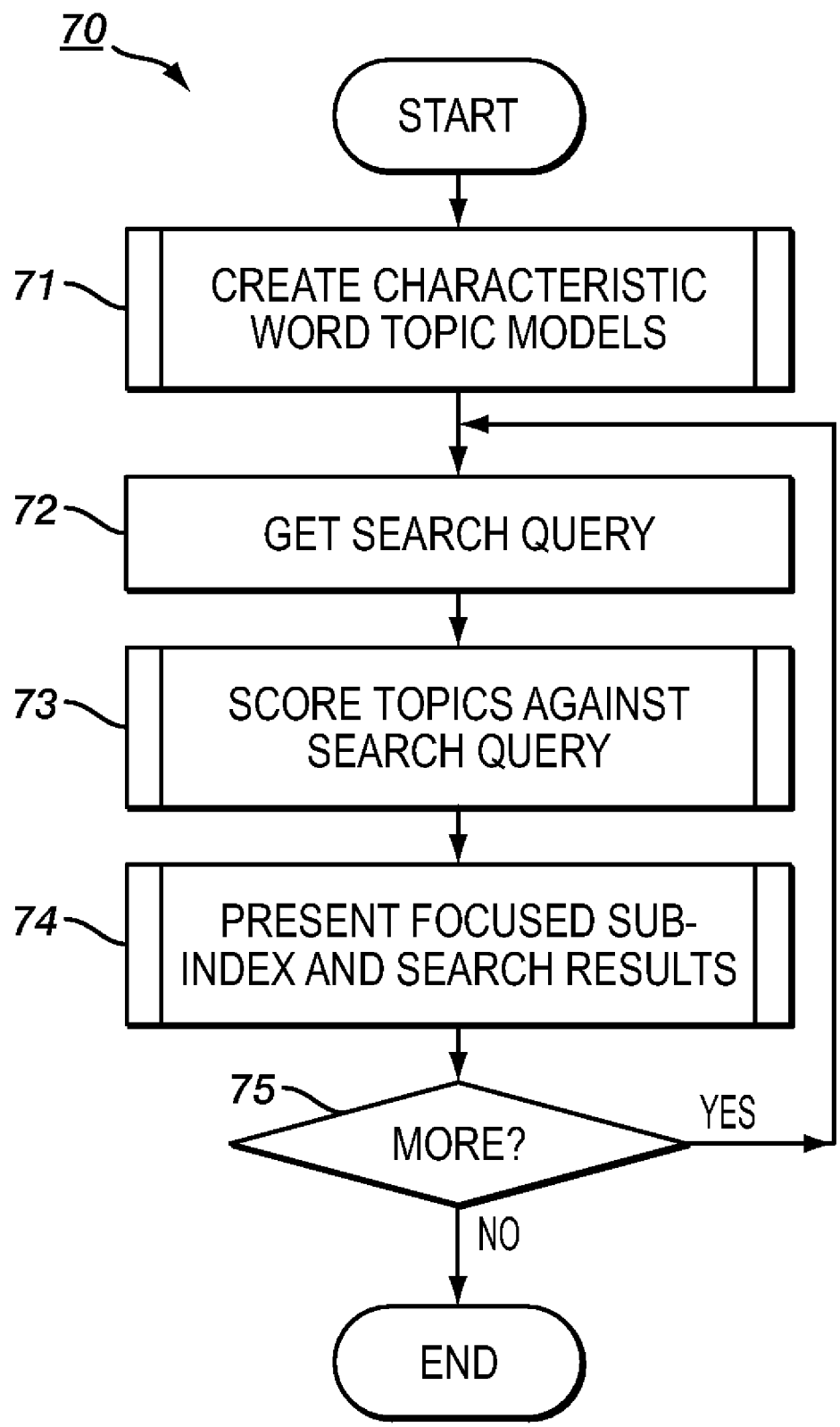
FIG. 4 is a flow diagram showing a method for providing a topic-directed search in accordance with one embodiment.

Topic search 23 organizes results from search queries by topic, as further described below beginning with reference to FIG. 4. Topic search 23 returns not only information, but also either a set of the top indexes out of all indexes and their top topics, such as further described below with reference to FIG. 10, or just the top topics within a focused sub-index, such as further described below with reference to FIG. 11, which both tie the information found with topics chosen that are most closely connected with the information. Topic search 23 includes a pre-computing module that creates a coarse-grained topic model 32, also known as a characteristic word topic model, for each topic in the topical index 29. Topic search 23 also includes a query processing module 25 that is coupled to a search engine (not shown). Query processing 25 generates either a set of top indexes together with their top topics, or a focused sub-index of topics that have been selected from a specific topical index 29. Search results and the top indexes and their top topics, or just the top topics within the focused sub-index are visually displayed to the user through a user interlace.

Finally, the coarse-grained topic model 32 for each topical index 29 and the set of topical indexes 33 are maintained in centralized storage 28. User services 26 provide a front-end to users 30a-b to access the set of topical indexes 33 and the incoming content 27, to perform search queries on the set of topical indexes 33 or a single topical index 29, and to access search results, top indexes, and focused sub-indexes. In a still further embodiment, each topical index 29 is tied to a community of users, known as an "augmented" community, which has an ongoing interest in a core subject area. The community "vets" information cited by voting 30 within the topic to which the information has been assigned.

Focused Sub-Indexes

The corpus of digital information is organized into one or more topical hierarchies though topical indexes 29. There is a corpus of information for each topical index 29 and the complete corpus for the system includes the corpora for all of the individual indexes 29. FIG. 3 is a screen shot diagram showing, by way of example, a user interface 40 providing select digital information 41 and a topically-related sub-index 42. By showing the relevant topics within a specific topical index 29 that are available during search as a sub-index, a user is able to focus his search efforts and find needed information quickly.

The select digital information 41 can be an article retrieved from the Web, a page of a book, or other text referenced through a topical index. The topically-related sub-index 42 is a subset of a full-index 29 that is selected and displayed by the topical search system 12 in response to search query terms when a search is performed within a specific index 29. In this example, the citations in each of the sub-index entries reference locations in the text through page numbers, and the most important pages on a sub-topic are displayed with emphasis, such as in bold type face, to underscore particular importance. Alternatively, KWIC indications could be placed within the text, such as through underlining, which call attention to how a search query term is used in the select digital information 41 displayed.

The sub-index 42 organizes search results by topics and orients the user to major categories within the index 29 and to the structure of the subject matter displayed. Context entries or nodes 43 provide a broader set of topics at low topical resolution. Focus entries or nodes 44 point to specific locations within the digital information 41 displayed for each sub-topic shown in the sub-index 42 to provide high topical resolution.

The user interface 40 facilitates context nodes with high level, low resolution topical index entries and with focused, high resolution context index entries. The higher-level context nodes provide a broad guide to the specific topics without significantly increasing the space required for displaying the sub-index 42. The space allocated to the focus nodes and the context nodes is balanced depending upon an estimate of the kind of information that is considered to best guide the user. If the user's needs are less certain, context nodes are provided with more space within the user interface to help the user quickly recognize and digest the general topic area and follow the context nodes to specific information. If the user's needs are more certain, focus nodes are provided more information within the user interface to narrow and amplify specific information.

Method

In one mode, topic-directed search identifies the top indexes within the full set of topical indexes 33, together with their top topics. In another mode, topic-directed search creates a short, focused sub-index that highlights topics in a specific index 29 that have been selected for their relevance in response to user-provided search terms. FIG. 4 is a flow diagram showing a method 70 for providing a topic-directed search in accordance with one embodiment. The method is performed as a series of process or method steps performed by, for instance, a general purpose programmed computer, such as server.

The method 70 is performed in two stages. First, during the pre-computing stage, coarse-grained topic models, that is, characteristic word topic models, are created for each topic (step 71), as further described below with reference to FIGS. 7 and 8. Each coarse-grained topic model identifies words that are important for each topic and a measure or score of the relative importance of each characteristic word identified.

Second, search queries are processed (steps 72-75). Searching can occur in two modes: (1) across all indexes, and (2) within an index. In searching across all indexes, a query is matched to a characteristic word index model to find the top indexes. Then, for each index, the query is matched against, characteristic word topic models to find the top topics within the index. The search results contain the top indexes together with their top topics. In searching within an index a query is matched against characteristic word topic models to find the top topics within the index. The search results contain the top topics in the index.

For both search modes, a search query is received from a user and executed (step 72), either across the foil set of topical indexes 33 or within an particular topical index 29, as applicable. A search query can specify one or more search terms. The topics in the full index set 33 or specific index 29 are scored against the search query (step 73) and the search results and either the top indexes and their top topics or just the top topics in the focused sub-index are respectively presented (step 74), as further described below respectively with reference to FIGS. 9 and 10. The query processing stage (steps 72-75) is performed repeatedly for each successive query (step 75).

Pre-Computing Stage

Figure 5:
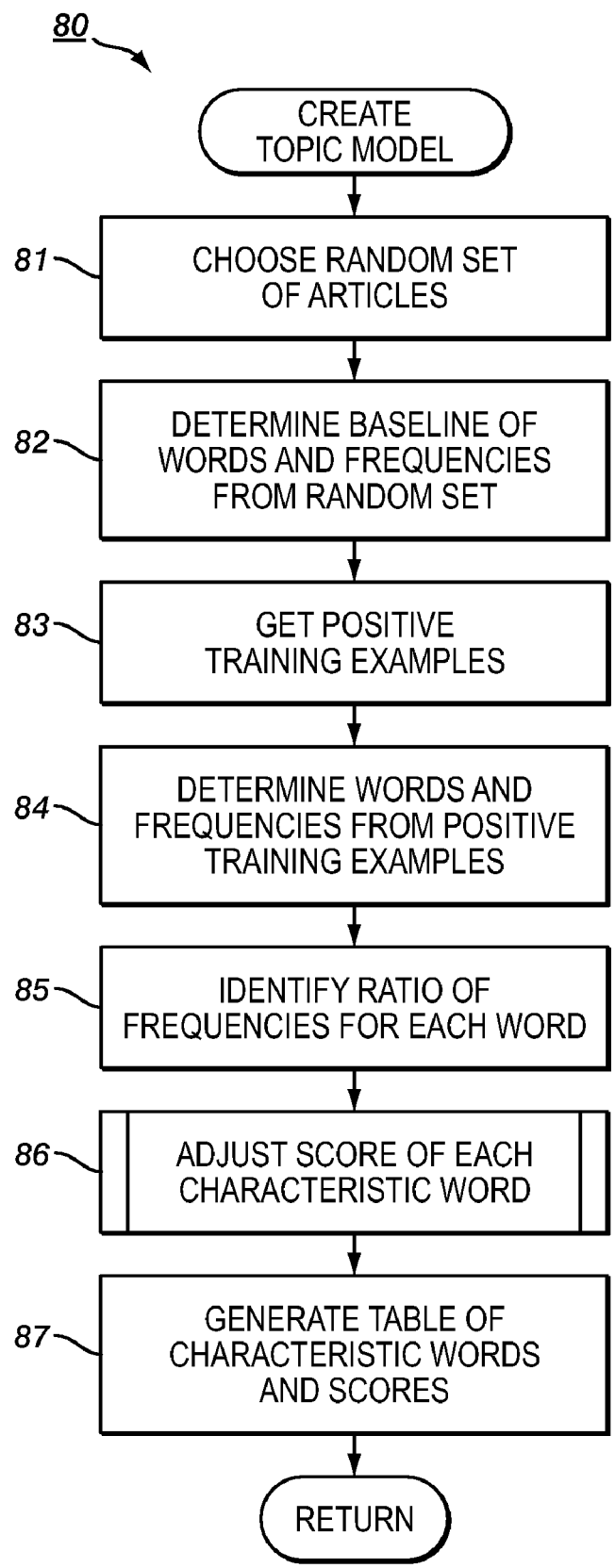
FIG. 5 is a flow diagram showing a routine for creating coarse-grained topic models for use with the routine of FIG. 4.

The pre-computing stage can be performed independently of and prior to the search query processing. FIG. 5 is a flow diagram showing a routine 80 for creating coarse-grained topic models for use with the routine 70 of FIG. 4. The coarse-grained topic models contain characteristic words and a score that reflects the relative importance of each characteristic word.

Characteristic words are useful in discriminating text about a topic and are typically words selected from the articles in the applicable corpus, which can include Web pages, electronic books, or other digital information available as printed material. Initially, a set or sampling of articles is randomly selected out of the applicable corpus (step 81). A baseline of characteristic words and their frequencies of occurrence are extracted from the random set of articles (step 82). Baselines for topics in an index 29 are determined over the corpus of the index 29. Baselines for the complete set of indexes 33 are computed over the overall system corpus, which is the corpora for all of the individual indexes 29. To reduce latency, the frequencies of occurrence of each characteristic word in the baseline can be pre-computed. In one embodiment, the number of articles appearing under the topics in an index is monitored, such as on an hourly basis. Periodically, when the number of articles has changed by a predetermined amount, such as ten percent, the frequencies of occurrence are re-determined. Next, a set of positive training examples, as selected by a user, is obtained (step 83). The positive training examples can be the same set of articles used during supervised learning when building fine-grained topic models, described supra. In a further embodiment, a sampling of articles that match fine-grained topic models could be used in lieu of the positive training examples. Characteristic words are extracted from the positive training examples and the frequency of occurrence of each characteristic word in the positive training examples is determined (step 84). A measure or score is assigned to each characteristic word using, for instance, term frequency-inverse document frequency (TF-IDF) weighting, which identifies the ratio of frequency of occurrence of each characteristic word in the positive training examples to the frequency of occurrence of each characteristic word in the baseline (step 85). The score of each characteristic word can be adjusted (step 86) to enhance or discount the importance of the characteristic word to the topic. Finally, a table of the characteristic words and their scores is generated (step 87) for use in the query processing stage. The table can be a sorted or hashed listing of the characteristic words and their scores. Other types of tables are possible.

Different "actors" perform the actions in creating coarse-grained models. The actor for choosing a random set of articles, and determining a baseline is the system. The actor for choosing positive training examples is the index manager, who is a person. In selecting positive training examples, the manager is in effect establishing the boundaries of topics. All of the remaining steps are performed by the system. Since the selection of positive training examples is done by a person, the selection can be completed ahead of time and prior to any of the other steps in the routine. In other words, the routine takes as input a set of articles in a corpus, and a set of articles from the corpus that have been designated as positive training examples. The same observation holds in the case where the positive training examples are articles that match the fine-grained models. Here, the fine-grained models come from a "default training algorithm," which creates fine-grained patterns based on topic labels. These two approaches to creating fine-grained topic models are called "default topic training" and "example-based topic training."

Figure 6:
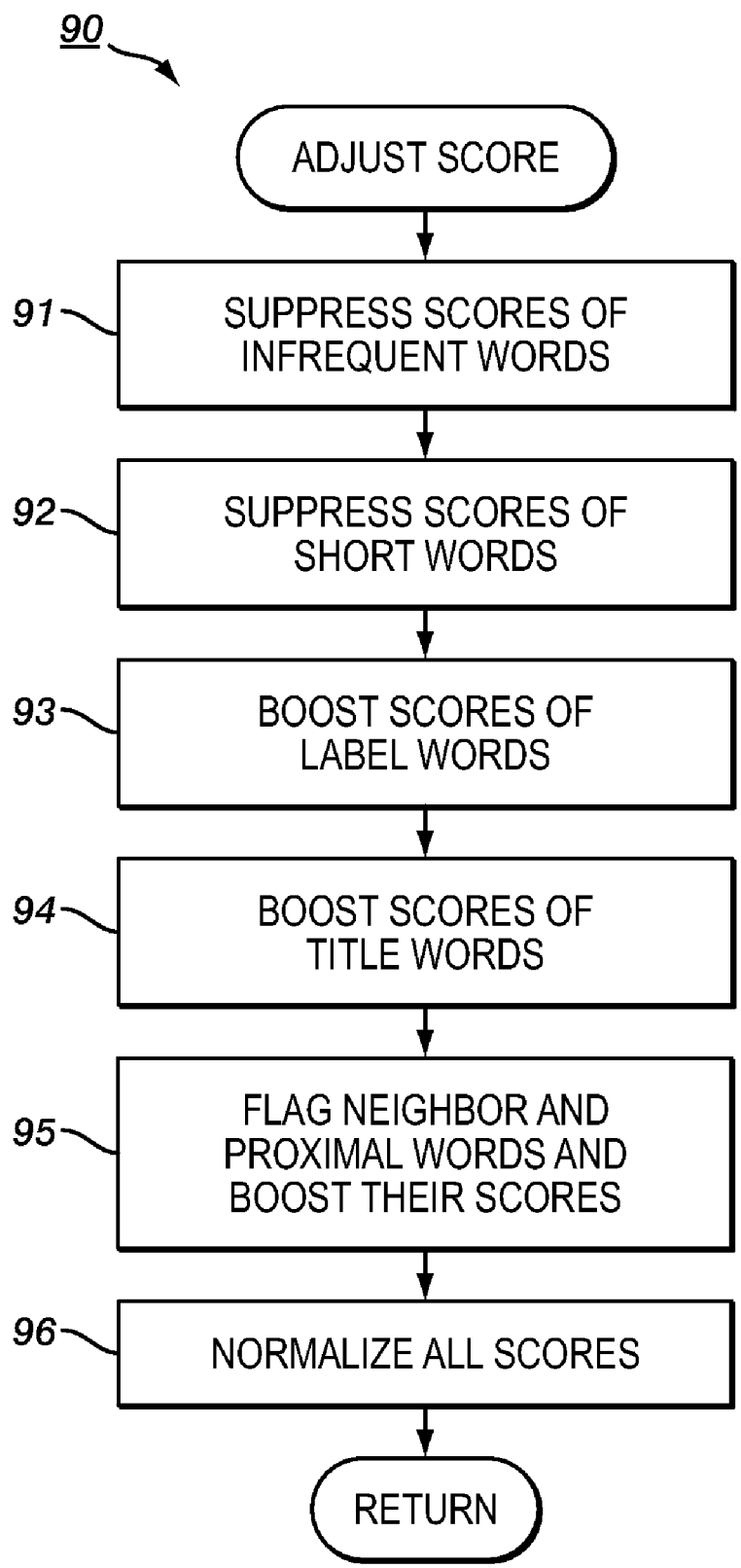
FIG. 6 is a flow diagram showing a routine for adjusting characteristic word score for use with the routine of FIG. 5.

The score of each characteristic word reflects a raw ratio of frequencies of occurrence. FIG. 6 is a flow diagram showing a routine 90 for adjusting characteristic word score for use with the routine 80 of FIG. 5. Heuristically, the score of each characteristic word can be adjusted in several ways depending upon context. For instance, the scores of infrequent words, that is, words that appear fewer than a minimum number of times in the corpus or in the set of cited materials can by suppressed or reduced (step 91) by, for example, 25 percent. Similarly, the scores of words with a length of less than a minimum threshold of characters can be suppressed (step 92) by a similar percent, as short words are not likely to have high topical significance. Conversely, words that appear in labels or in titles reflect strong topicality and their scores are boosted or increased (steps 93 and 94, respectively) by the number of times that the word appears in the sample. Typically, all label words are included as characteristic words. Lastly, the scores of words appearing adjacent to label words, that is, neighboring words, and "proximal" words appearing around label words within a set window are boosted (step 95). Normalized thresholds are applied during neighboring and proximal word selection. Default thresholds of eight and fifteen percent of the maximum score are respectively applied to neighboring and proximal words with a set window size of eight words. Other representative thresholds and lengths can be used. Finally, the scores of the characteristic words are normalized (step 96). The characteristic word having the highest score is also the most unique word and that score is set to 100 percent. The scores of the remaining characteristic words are scaled based on the highest score. Thus, upon the completion of characteristic word selection, each topic in the index has a coarse-grained topic model, which has been expressed in terms of characteristic words that have been normalized over the materials sampled from the corpus.

Query Processing Stage

Figure 7:
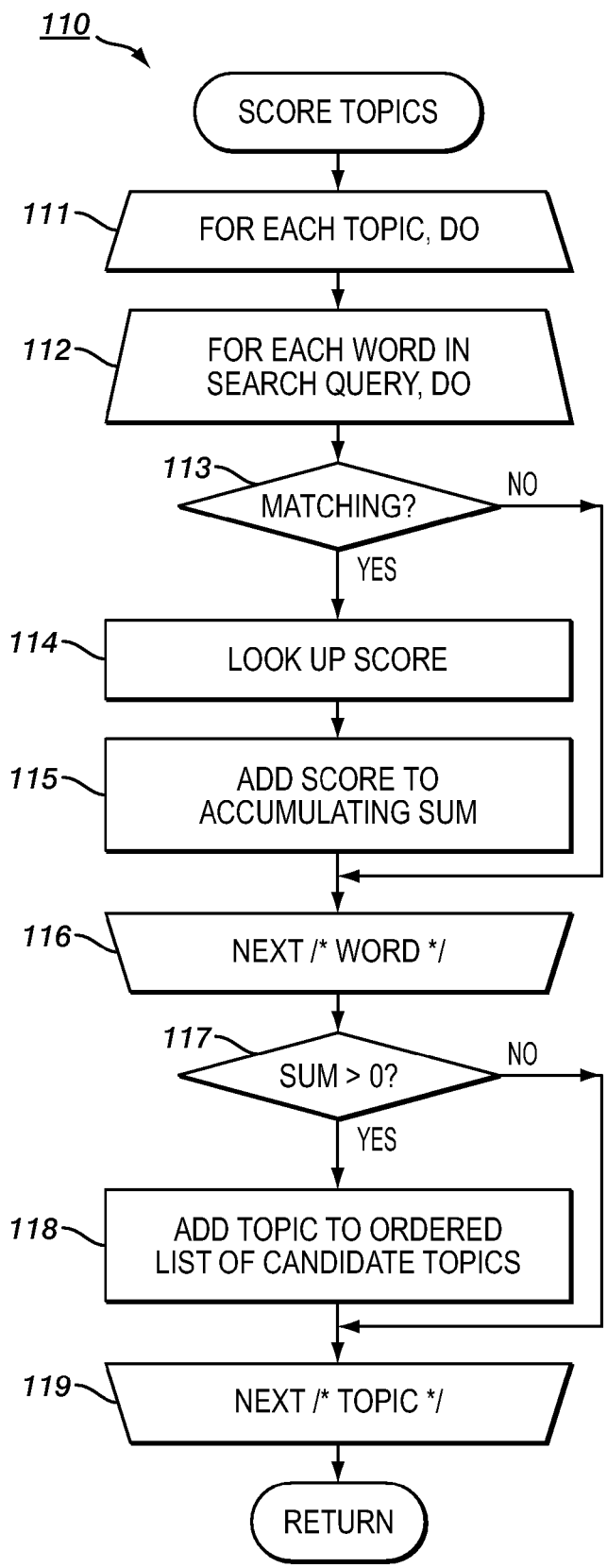
FIG. 7 is a flow diagram showing a routine for scoring topics for use with the method of FIG. 4.

During query processing, search terms that have been received through a user interface are matched against the coarse-grained topic models and used to guide the selection of topics from a full index for the corpus. FIG. 7 is a flow diagram showing a routine 110 for scoring topics for use with the method 70 of FIG. 4. The search terms are matched against the coarse-grained topic models through accumulated term lookup.

Each topic in the full index and each term in the search query are evaluated (steps 111-119 and 112-116, respectively). For each term (step 112) that matches the topic (step 113), the score of the corresponding characteristic word is looked up in the table (step 114) and added to an accumulating sum (step 115). Where the characteristic words table is hashed, the term serves as a lookup key. The sum is accumulated for each of the search query terms (step 116), after which only those topics having an accumulated sum exceeding zero (step 117), or a predetermined threshold, are kept. Those topics and their accumulated sum scores added to an ordered list of candidate topics (step 118). In a further embodiment, the most relevant indexes in a set of topical indexes 33 together with their top topics are chosen, rather than just the most relevant topics in a particular topical index 29.

In a still further embodiment, the Individual score of each characteristic word is evaluated against a minimum threshold and the topic is either discounted or discarded, if one or more of the scores falls to meet the threshold. This check helps filter out those topics that only partially match the search query terms, such as where a subset of characteristic words having high scores match part of the topic with along with other low scoring characteristic words.

Figure 8:
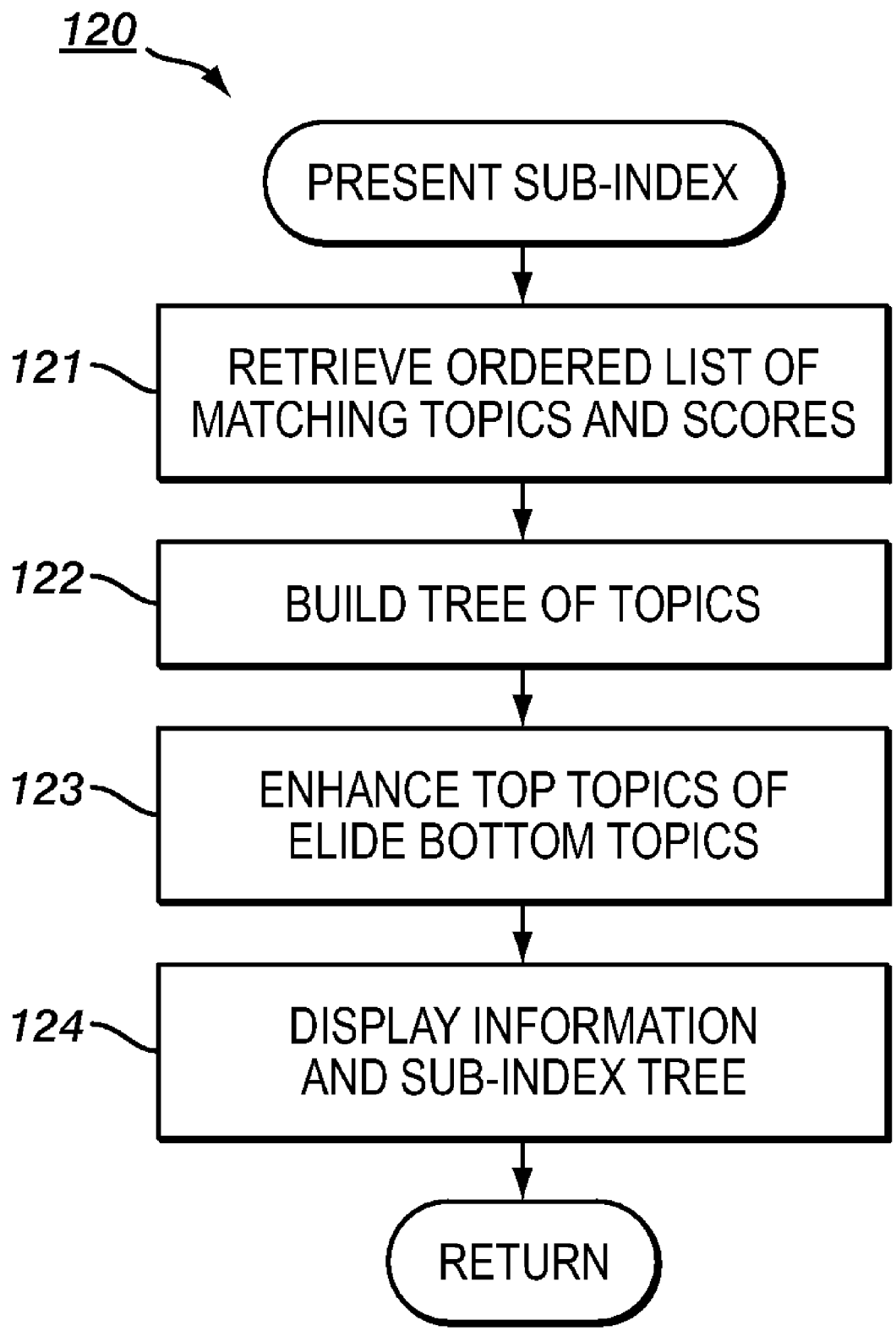
FIG. 8 is a flow diagram showing a routine for presenting a sub-index for use with the method of FIG. 4.

The information provided as search results can vary. For instance, broad search queries usually generate more search results than can be conveniently displayed on a single Web page and a subset of the search results may be provided Instead of the entire set. FIG. 8 is a flow diagram showing a routine 120 for presenting a sub-index for use with the method 70 of FIG. 4. The ordered list of topics and accumulated sum scores is retrieved (step 121) and a sub-index tree of topics is built (step 122). The parent topic of each topic is included in the topic tree. The sub-topics represent focus nodes, while the parent topics represent context nodes. Other topics, that is, topics that do not match the search query terms or which are not parent topics, are not shown. Sibling topics under each branch of the tree are provided in alphabetic order, although other orderings are possible. Top-scoring topics can be enhanced or highlighted, such as by color, bold face type, or underlining, and bottom-scoring topics can be elided (step 123) where, for instance, a topic falls below a set matching score. Emphasis based on non-normalized scores can be provided by emphasizing the top m percent of the search results, where m is set to twenty percent by default, although other limits could be used. Emphasis based on normalized scores can be provided by emphasizing, for instance, the topics having an accumulated sum score exceeding a threshold, such as sixty percent, or the topics whose top-scoring characteristic words are also search terms. Other forms and criteria for search term emphasis are possible. Finally, the information that constitutes tire search results and the sub-index tree are displayed (step 124).

User Interfaces

Figure 9:
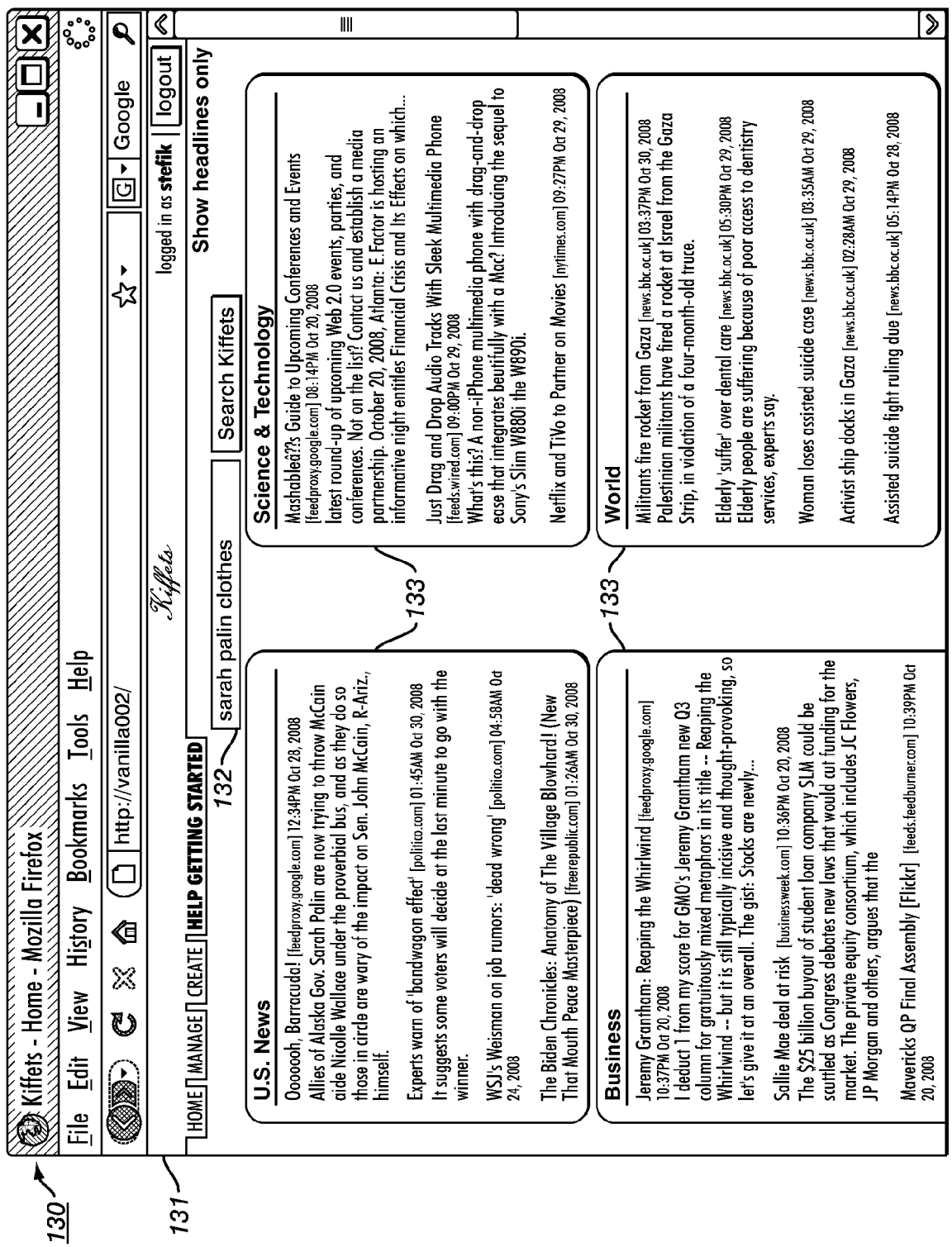
FIGS. 9-11 are diagrams showing, by way of example, screen shot of user interfaces providing expanded focused and topical sub-indexes.
Figure 10:
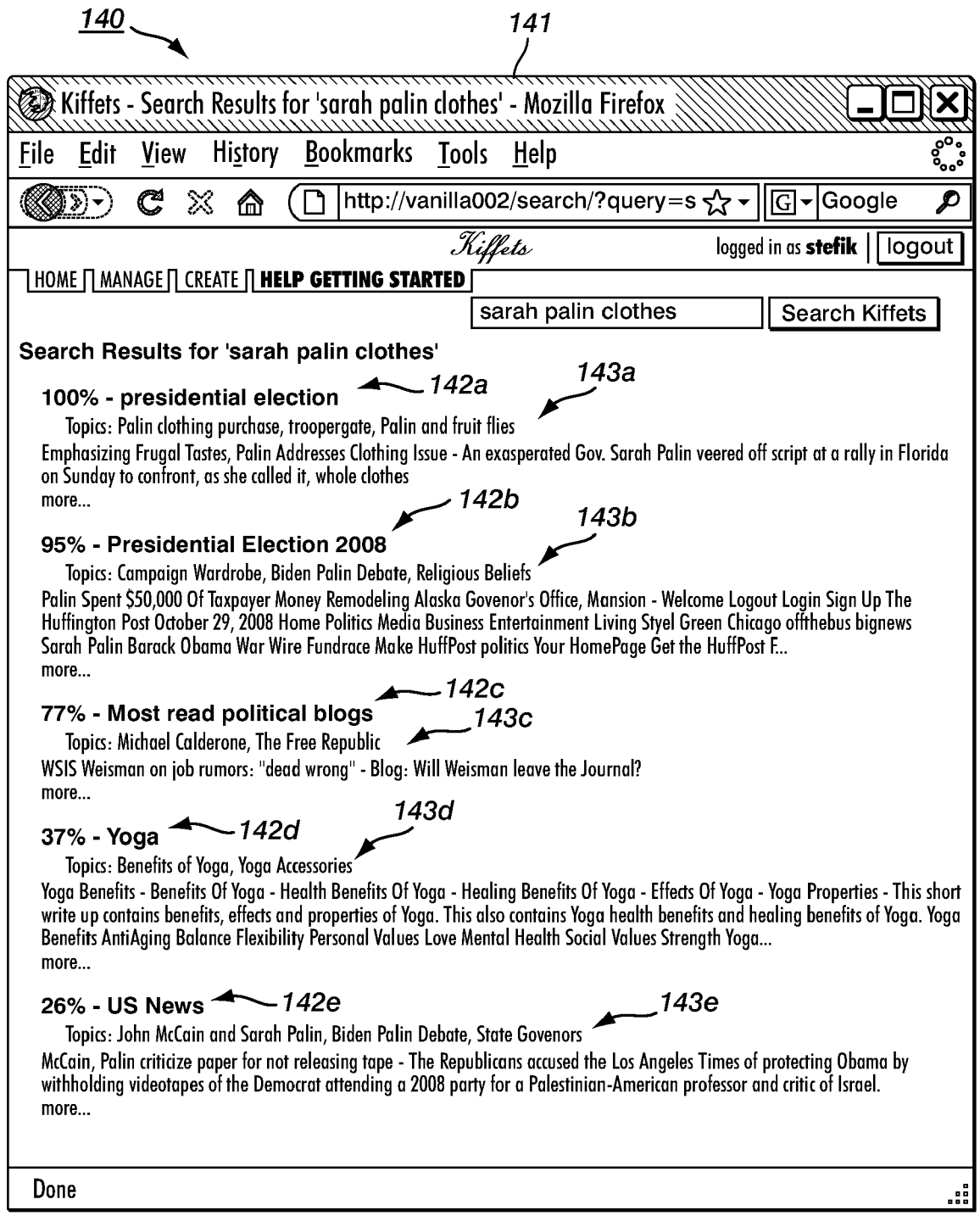
Figure 11:
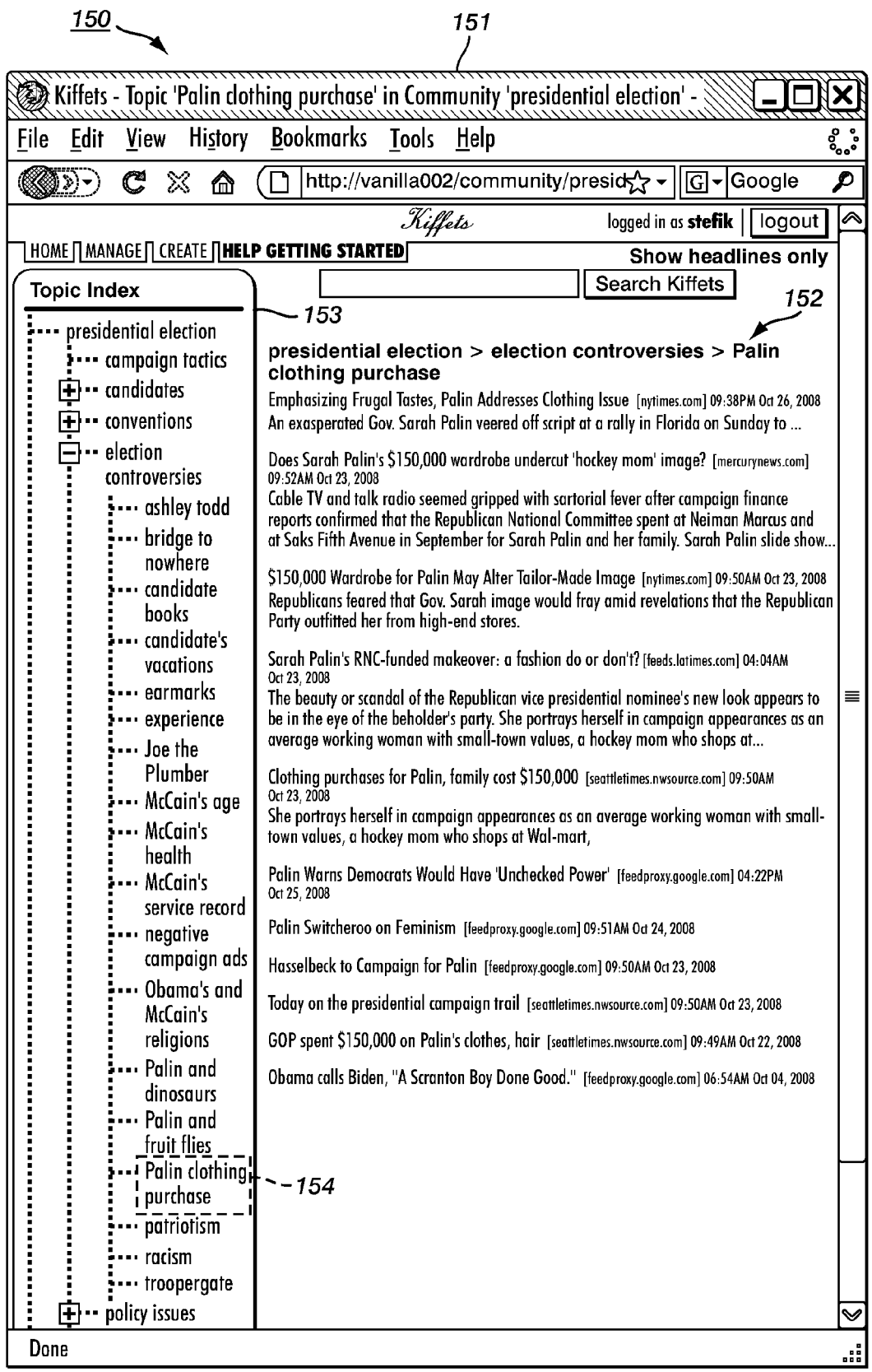

Sub-indexes facilitate topical information selection and display, which are guided by an estimated degree of interest. FIGS. 9-11 are diagrams showing, by way of example, screen shots 130, 140, 150 of user interfaces 131, 141, 151 providing expanded focused and topical sub-indexes. Referring first to FIG. 9, a user has specified a search query by entering a list of terms 132. The search query has been entered, but not executed. The panels 133 within the user interface 131 show several of the topical indexes available in the system.

Topic search returns not only information, but also either a set of top indexes and their top topics, or a focused sub-index that ties tire information, found with the topics that are most closely connected with the information. The focused sub-index index enables users to self-orient themselves to the search results. Through the user interface, a user can perform top-level searches over all known indexes, which can identify top indexes and their top topics. Referring next to FIG. 10, an all-index search has been performed and the search results are provided, which include the top indexes 142*a-e* and their top topics 143*a-e*. A user can also perform within-index searches, which search over ail topics within a particular index and displays a topic tree that emphasizes top topics. Referring finally to FIG. 11, a single index search has been performed and the search results 152 are provided, which presents a list of articles retrieved. A focused sub-index 153 organizes results from the search query by as a topic tree, with the specific topic displayed 154 presented with highlighting.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for providing a topic-directed search, comprising:
    a plurality of evergreen indexes for topically-limited subject areas, each of the subject areas comprising articles of digital information and for each of the evergreen indexes, comprising:
    a hierarchy of topics; and
    a fine-grained topic model paired to each of the topics in the topic hierarchy, each of the fine-grained topic models comprising a pattern evaluable against the articles, wherein the pattern identifies such articles matching the fine-grained topic model's topic, that are both electronically-stored in persistent storage;
    a computer comprising a processor and memory within which code for execution by the processor is stored, comprising:
    a topic builder that, for each topic in each of the evergreen indexes, maintains a coarse-grained topic model comprising:
    a characteristic word extractor that extracts characteristic words from the articles identified by the fine-grained topic models of each topic; and
    a characteristic word scorer that assigns scores to the characteristic words; and
    a search engine that specifies a topic search comprising search terms, and that evaluates the coarse-grained topic model of each of the topics in the evergreen indexes by matching the search terms and accumulating their scores;
    a user interface that visually presents the evergreen indexes comprised of the topics that comprise the coarse-grained topic models having the best scores; and further comprising at least one of:
    a display module comprising code for execution by the processor that comprises:
    a topic emphasizer highlighting the topics in the best scoring evergreen indexes as presented in the user interface, comprising at least one of emphasizing a to percentile of the articles corresponding to the search query, emphasizing the topics whose matching coarse-grained topic models have a cumulative score exceeding a threshold, and emphasizing the topics comprising top-scoring characteristic words that match the search terms; and
    a topic elider eliding the topics presented in the user interface that fall below a set matching score;
    an index identifier identifying the best scoring evergreen indexes by one or more of name, theme, and augmented community of online users; and
    a pattern evaluator evaluating each of the patterns for the fine-grained topic models comprised in the best scoring evergreen indexes against the digital information, the fine-grained topic models corresponding to the topics that comprise the coarse-grained topic models having the best scores, and providing access to at least a part of only that digital information that matches at least one of the patterns.

2. A system according to claim 1, further comprising:
    a model builder comprising code for execution by the processor that comprises:
    a random sampler selecting a random sampling of the articles matching a topic; and
    a scoring module determining frequencies of occurrence of the characteristic words comprised in the articles in the random sampling and in positive training examples, and identifying a ratio of the frequencies of occurrence for the characteristic words comprised in the random sampling and the positive training examples,
wherein the ratios of the characteristic words are included as the scores of the coarse-grained topic models.

3. A system according to claim 2, further comprising:
a pre-computing monitor comprising code for execution by the processor that comprises:
a counter monitoring a number of articles comprised in the topics of the index; and
an analyzer periodically re-determining the frequencies of occurrence of the characteristic words comprised in the articles in the random sampling when the number of articles has changed by a predetermined amount.

4. A system according to claim 2, wherein a sampling of articles matching the fine-grained topic models for each topic is selected in lieu of the positive training examples.

5. A system according to claim 1, further comprising:
a scoring module comprising code for execution by the processor that comprises:
an evaluator finding the highest score for the coarse-grained topic models; and
a normalizer normalizing the scores of the remaining coarse-grained topic models against the highest score.

6. A system according to claim 1, further comprising:
a scoring module comprising code for execution by the processor that comprises:
a comparison module, for each topic, comparing the score of each coarse-grained topic model corresponding to one of the search terms to a threshold; and
an evaluator either discounting or discarding the topic when at least one of the scores fails to exceed the threshold.

7. A system according to claim 1, further comprising:
a scoring module comprising code for execution by the processor that comprises:
a score adjuster adjusting the scores of the coarse-grained topic models, comprising one or more of:
an infrequent word evaluator reducing the score for each characteristic word appearing fewer than a minimum number of times in the articles;
a short word evaluator reducing the score for each characteristic word comprising a length of less than a minimum number of characters;
a label word evaluator increasing the score for each characteristic word appearing in an index label of one or more of the articles; and
a neighboring word evaluator increasing the score of each characteristic word either neighboring or appearing adjacent to another characteristic word appearing in an index label of one or more of the articles.

8. A computer-implemented method for providing a topic-directed search, comprising:
maintaining a plurality of evergreen indexes for topically-limited subject areas, each of the subject areas comprising articles of digital information and for each of the evergreen indexes, comprising:
specifying a hierarchy of topics; and
pairing a fine-grained topic model to each of the topics in the topic hierarchy, each of the fine-grained topic models comprising a pattern evaluable against the articles, wherein the pattern identifies such articles matching the fine-grained topic model's topic;
for each topic in each of the evergreen indexes, maintaining a coarse-grained topic model comprising:
specifying characteristic words extracted from the articles identified by the fine-grained topic models of each topic; and
assigning scores to the characteristic words;
specifying a topic search comprising search terms;
evaluating the coarse-grained topic model of each of the topics in the evergreen indexes by matching the search terms and accumulating their scores;
presenting the evergreen indexes comprised of the topics that comprise the coarse-grained topic models having the best scores through a user interface; and further comprising at least one of:
highlighting the topics in the best scoring evergreen indexes as presented in the user interface, comprising at least one of:
emphasizing a to percentile of the articles corresponding to the search query;
emphasizing the topics whose matching coarse-grained topic models have a cumulative score exceeding a threshold; and
emphasizing the topics comprising top-scoring characteristic words that match the search terms;
eliding the topics presented in the user interface that fall below a set matching score;
identifying the best scoring evergreen indexes by one or more of name, theme, and augmented community of online users; and
evaluating each of the patterns for the fine-grained topic models comprised in the best scoring evergreen indexes against the digital information, the fine-grained topic models corresponding to the topics that comprise the coarse-grained topic models having the best scores, and providing access to at least a part of only that digital information that matches at least one of the patterns.

9. A method according to claim 8, further comprising:
selecting a random sampling of the articles matching a topic;
determining frequencies of occurrence of the characteristic words comprised in the articles in the random sampling and in positive training examples;
identifying a ratio of the frequencies of occurrence for the characteristic words comprised in the random sampling and the positive training examples; and
including the ratios of the characteristic words as the scores of the coarse-grained topic models.

10. A method according to claim 9, further comprising:
monitoring a number of articles comprised in the topics of the index; and
periodically re-determining the frequencies of occurrence of the characteristic words comprised in the articles in the random sampling when the number of articles has changed by a predetermined amount.

11. A method according to claim 9, further comprising:
selecting a sampling of articles matching the fine-grained topic models for each topic in lieu of the positive training examples.

12. A method according to claim 8, further comprising:
finding the highest score for the coarse-grained topic models; and
normalizing the scores of the remaining coarse-grained topic models against the highest score.

13. A method according to claim 8, further comprising:
for each topic, comparing the score of each coarse-grained topic model corresponding to one of the search terms to a threshold; and
either discounting or discarding the topic when at least one of the scores fails to exceed the threshold.

14. A method according to claim 8, further comprising:

adjusting the scores of the coarse-grained topic models, comprising one or more of:

reducing the score for each characteristic word appearing fewer than a minimum number of times in the articles;

reducing the score for each characteristic word comprising a length of less than a minimum number of characters;

increasing the score for each characteristic word appearing in an index label of one or more of the articles; and increasing the score of each characteristic word either neighboring or appearing adjacent to another characteristic word appearing in an index label of one or more of the articles.

15. A system according to claim 1, further comprising:

a pattern evaluator evaluating each of the patterns for the fine-grained topic models comprised in the best scoring evergreen indexes against the articles of digital information, the evaluated fine-grained topic models corresponding to the topics associated with the coarse-grained topic models having the best scores, and providing access to at least a part of the set of articles in the digital information that match at least one of the patterns.

16. A method according to claim 8, further comprising:

evaluating each of the patterns for the fine-grained topic models comprised in the best scoring evergreen indexes against the articles of digital information, the evaluated fine-grained topic models corresponding to the topics associated with the coarse-grained topic models having the best scores; and providing access to at least a part of the set of articles in the digital information that match at least one of the patterns.

* * * * *